United States Patent
Wong et al.

(10) Patent No.: US 12,070,148 B2
(45) Date of Patent: Aug. 27, 2024

(54) SYSTEM, CAPSULE AND METHOD FOR PREPARING A PREDETERMINED QUANTITY OF BEVERAGE

(71) Applicant: Koninklijke Douwe Egberts B.V., Utrecht (NL)

(72) Inventors: Kon Euan Gerard Wong, Utrecht (NL); Guido Brandt, Utrecht (NL); Hendrik Cornelis Koeling, Utrecht (NL); Ralf Kamerbeek, Utrecht (NL); Arend Cornelis Jacobus Biesheuvel, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 51 days.

(21) Appl. No.: 16/355,174

(22) Filed: Mar. 15, 2019

(65) Prior Publication Data

US 2019/0208950 A1 Jul. 11, 2019

Related U.S. Application Data

(60) Division of application No. 13/326,291, filed on Dec. 14, 2011, now Pat. No. 10,231,571, which is a
(Continued)

(30) Foreign Application Priority Data

Jun. 17, 2009 (EP) ..................................... 09162934
Jun. 17, 2009 (EP) ..................................... 09162982
(Continued)

(51) Int. Cl.
*A47J 31/36* (2006.01)
*B65D 65/46* (2006.01)
(Continued)

(52) U.S. Cl.
CPC ....... *A47J 31/3695* (2013.01); *A47J 31/3676* (2013.01); *A47J 31/368* (2013.01);
(Continued)

(58) Field of Classification Search
CPC .. A47J 31/3695; A47J 31/3676; A47J 31/368; A47J 31/3685; B65D 65/466;
(Continued)

(56) References Cited

U.S. PATENT DOCUMENTS 2,968,560 A * 1/1961 Goros ................. A47J 31/3628
99/295
3,615,708 A * 10/1971 Abile-Gal ............... A47J 31/02
426/77
(Continued)

FOREIGN PATENT DOCUMENTS

CN 1125681 6/1996
CN 1612831 5/2005
(Continued)

OTHER PUBLICATIONS

International Search Report for PCT Patent Application No. PCT/NL2009/050816, dated Mar. 1, 2010, 2 pages.
(Continued)

*Primary Examiner* — Jimmy Chou
(74) *Attorney, Agent, or Firm* — Foley & Lardner LLP

(57) ABSTRACT

A capsule for holding an extractable product for dispensing a beverage is disclosed. The capsule comprising a circumferential wall, a bottom, a lid, and an entrance opening portion and an exit opening portion for letting fluid in the capsule and draining prepared beverage from the capsule, respectively, of which at least one opening portion is closed to prevent fluid from passing. The circumferential wall, the bottom and the lid of the capsule enclose an inner space that comprises an extractable product, and the capsule further
(Continued)

comprises at least one moveable portion of the capsule that extends at a distance from a respective opening portion, and that is arranged to open the respective opening portion by being moved with respect to the respective opening portion.

12 Claims, 11 Drawing Sheets

Related U.S. Application Data continuation of application No. PCT/NL2009/050815, filed on Dec. 30, 2009.

(30) Foreign Application Priority Data

| Jun. 17, 2009 | (EP) | .................................. | 09162995 |
| Jun. 17, 2009 | (EP) | .................................. | 09162998 |

(51) Int. Cl.
  *B65D 77/32*   (2006.01)
  *B65D 77/38*   (2006.01)
  *B65D 85/804*  (2006.01)

(52) U.S. Cl.
  CPC ........ *A47J 31/3685* (2013.01); *B65D 65/466* (2013.01); *B65D 77/32* (2013.01); *B65D 77/38* (2013.01); *B65D 85/8046* (2013.01); *B65D 85/8049* (2020.05); *B65D 85/8052* (2020.05); *B65D 85/8061* (2020.05)

(58) Field of Classification Search
  CPC .... B65D 77/32; B65D 77/38; B65D 85/8043; B65D 85/8046
  USPC .......... 99/286, 289 R, 295, 302 R, 307, 323; 426/77, 78, 79, 112, 433, 115
  See application file for complete search history.

(56) References Cited

U.S. PATENT DOCUMENTS

| 4,136,202 | A | * | 1/1979 | Favre | ................ | B65D 85/8049 |
| | | | | | | 426/77 |
| 4,321,139 | A | | 3/1982 | Auclair | | |
| 4,417,504 | A | | 11/1983 | Yamamoto | | |
| 4,846,052 | A | * | 7/1989 | Favre | ................ | A47J 31/3695 |
| | | | | | | 99/295 |
| 4,859,337 | A | | 8/1989 | Woltermann | | |
| 5,325,765 | A | * | 7/1994 | Sylvan | ................ | A47J 31/0673 |
| | | | | | | 426/433 |
| 5,327,815 | A | * | 7/1994 | Fond | .................... | A47J 31/369 |
| | | | | | | 99/295 |
| 5,398,595 | A | * | 3/1995 | Fond | .................. | A47J 31/0668 |
| | | | | | | 99/295 |
| 5,402,707 | A | * | 4/1995 | Fond | .................. | A47J 31/0678 |
| | | | | | | 99/295 |
| 5,472,719 | A | * | 12/1995 | Favre | ................ | B65D 85/8061 |
| | | | | | | 426/77 |
| 5,649,472 | A | * | 7/1997 | Fond | .................. | A47J 31/0673 |
| | | | | | | 99/295 |
| 5,762,987 | A | * | 6/1998 | Fond | .................. | A47J 31/0673 |
| | | | | | | 426/433 |
| 5,826,492 | A | * | 10/1998 | Fond | .................. | A47J 31/4464 |
| | | | | | | 99/295 |
| 5,840,189 | A | | 11/1998 | Sylvan et al. | | |
| D408,679 | S | | 4/1999 | Potts et al. | | |
| 5,897,899 | A | * | 4/1999 | Fond | ................ | B65D 85/8043 |
| | | | | | | 426/112 |
| 5,948,455 | A | * | 9/1999 | Schaeffer | ........... | B65D 85/8046 |
| | | | | | | 426/77 |
| 6,079,315 | A | * | 6/2000 | Beaulieu | ............. | A47J 31/3628 |
| | | | | | | 99/289 R |
| 6,082,247 | A | * | 7/2000 | Beaulicu | ............... | A47J 31/402 |
| | | | | | | 222/146.5 |
| 6,142,063 | A | * | 11/2000 | Beaulieu | ................. | A47J 31/56 |
| | | | | | | 99/283 |
| 6,182,554 | B1 | * | 2/2001 | Beaulieu | ............. | A47J 31/3628 |
| | | | | | | 99/289 R |
| D452,433 | S | | 12/2001 | Lazaris | | |
| D452,434 | S | | 12/2001 | Sweeney | | |
| 6,440,256 | B1 | | 8/2002 | Gordon et al. | | |
| D462,865 | S | | 9/2002 | Honan et al. | | |
| D474,110 | S | | 5/2003 | Sweeney | | |
| D474,111 | S | | 5/2003 | Lazaris | | |
| 6,589,577 | B2 | | 7/2003 | Lazaris et al. | | |
| 6,606,938 | B2 | * | 8/2003 | Taylor | ................ | A47J 31/0642 |
| | | | | | | 426/433 |
| 6,607,762 | B2 | | 8/2003 | Lazaris et al. | | |
| 6,644,173 | B2 | * | 11/2003 | Lazaris | ............... | A47J 31/3628 |
| | | | | | | 99/295 |
| 6,645,537 | B2 | | 11/2003 | Sweeney et al. | | |
| 6,655,260 | B2 | | 12/2003 | Lazaris et al. | | |
| 6,658,989 | B2 | | 12/2003 | Sweeney et al. | | |
| 6,666,130 | B2 | * | 12/2003 | Taylor | ................ | A47J 31/3695 |
| | | | | | | 222/146.5 |
| 6,672,200 | B2 | * | 1/2004 | Duffy | ................ | A47J 31/0642 |
| | | | | | | 222/146.5 |
| 6,708,600 | B2 | | 3/2004 | Winkler et al. | | |
| D489,215 | S | | 5/2004 | Honan et al. | | |
| 6,832,542 | B2 | * | 12/2004 | Hu | ...................... | A47J 31/0673 |
| | | | | | | 99/302 R |
| D502,362 | S | | 3/2005 | Lazaris et al. | | |
| D513,572 | S | | 1/2006 | Schaffeld et al. | | |
| 7,100,496 | B2 | * | 9/2006 | Majer Doglioni | . | B65D 85/8043 |
| | | | | | | 99/302 R |
| 7,165,488 | B2 | | 1/2007 | Bragg et al. | | |
| D544,299 | S | | 6/2007 | Schaffeld et al. | | |
| D554,299 | S | | 10/2007 | Ragonetti et al. | | |
| 7,279,188 | B2 | * | 10/2007 | Arrick | ................ | B65D 85/8043 |
| | | | | | | 426/112 |
| 7,347,138 | B2 | | 3/2008 | Bragg et al. | | |
| 7,360,418 | B2 | | 4/2008 | Pelovitz | | |
| 7,377,162 | B2 | | 5/2008 | Lazaris | | |
| 7,398,726 | B2 | | 7/2008 | Streeter et al. | | |
| 7,412,921 | B2 | * | 8/2008 | Hu | ...................... | A47J 31/4464 |
| | | | | | | 426/77 |
| 7,490,542 | B2 | * | 2/2009 | Macchi | ............... | A47J 31/3695 |
| | | | | | | 426/77 |
| 7,513,192 | B2 | | 4/2009 | Sullivan et al. | | |
| 7,523,695 | B2 | | 4/2009 | Streeter et al. | | |
| 7,543,527 | B2 | | 6/2009 | Schmed | | |
| 7,552,672 | B2 | * | 6/2009 | Schmed | ............ | B65D 85/8043 |
| | | | | | | 99/295 |
| 7,604,826 | B2 | * | 10/2009 | Denisart | ............ | A47J 31/0673 |
| | | | | | | 426/77 |
| 7,624,673 | B2 | * | 12/2009 | Zanetti | ............... | B65D 85/8043 |
| | | | | | | 99/295 |
| 7,640,845 | B2 | | 1/2010 | Woodnorth et al. | | |
| 7,703,381 | B2 | * | 4/2010 | Liverani | ............. | A47J 31/3695 |
| | | | | | | 99/295 |
| 7,815,953 | B2 | * | 10/2010 | Mastropasqua | .... | B65D 85/8043 |
| | | | | | | 426/77 |
| 7,836,819 | B2 | * | 11/2010 | Suggi Liverani | ... | A47J 31/0668 |
| | | | | | | 99/295 |
| 7,854,192 | B2 | * | 12/2010 | Denisart | ............. | A47J 31/3695 |
| | | | | | | 99/295 |
| 7,856,920 | B2 | * | 12/2010 | Schmed | ............. | A47J 31/0673 |
| | | | | | | 99/295 |
| 7,856,921 | B2 | * | 12/2010 | Arrick | ................ | B65D 85/8043 |
| | | | | | | 99/295 |
| 7,930,972 | B2 | * | 4/2011 | Denisart | ............. | A47J 31/3695 |
| | | | | | | 99/295 |
| 7,946,217 | B2 | * | 5/2011 | Favre | .................. | A47J 31/0668 |
| | | | | | | 99/295 |
| 7,993,691 | B2 | * | 8/2011 | Yoakim | ............... | A47J 31/3628 |
| | | | | | | 426/77 |
| 8,047,126 | B2 | * | 11/2011 | Doglioni Majer | .. | A47J 31/0642 |
| | | | | | | 99/302 R |

(56) References Cited

U.S. PATENT DOCUMENTS

| | | | | |
|---|---|---|---|---|
| 8,147,887 B2 * | 4/2012 | Dogan | B65D 85/8043 | 426/77 |
| 8,161,866 B2 * | 4/2012 | Kollep | B65D 85/8043 | 99/279 |
| 8,161,868 B2 * | 4/2012 | Bolzicco | B65D 85/8043 | 99/295 |
| 8,202,560 B2 * | 6/2012 | Yoakim | A47J 31/3628 | 426/431 |
| 8,220,382 B2 * | 7/2012 | Verbeek | B67D 1/0045 | 99/295 |
| 8,304,006 B2 * | 11/2012 | Yoakim | A47J 31/3695 | 426/431 |
| 8,322,271 B2 * | 12/2012 | Glucksman | B65D 85/8043 | 99/287 |
| 8,640,604 B2 * | 2/2014 | Doglioni Majer | A47J 31/0673 | 99/300 |
| 8,667,890 B2 * | 3/2014 | Macchi | B65D 85/8061 | 426/77 |
| 8,846,120 B2 * | 9/2014 | Wong | A47J 31/3685 | 426/77 |
| 9,387,979 B2 * | 7/2016 | Rapparini | B65D 85/8043 | |
| 10,442,610 B2 * | 10/2019 | Mack | B65D 85/8061 | |
| 2003/0172813 A1 | 9/2003 | Schifferle | | |
| 2004/0045443 A1 | 3/2004 | Lazaris et al. | | |
| 2004/0115317 A1 | 6/2004 | Doglioni | | |
| 2004/0182250 A1 * | 9/2004 | Halliday | A47J 31/4492 | 99/279 |
| 2004/0188459 A1 | 9/2004 | Halliday et al. | | |
| 2005/0051478 A1 * | 3/2005 | Karanikos | B65D 85/8043 | 210/469 |
| 2005/0150390 A1 * | 7/2005 | Schifferle | B65D 85/8055 | 99/295 |
| 2005/0205601 A1 | 9/2005 | Taylor | | |
| 2005/0287251 A1 | 12/2005 | Lazaris et al. | | |
| 2006/0019000 A1 * | 1/2006 | Zanetti | B65D 85/8043 | 426/112 |
| 2006/0110507 A1 * | 5/2006 | Yoakim | B65D 85/8043 | 426/433 |
| 2006/0174773 A1 | 8/2006 | Taylor | | |
| 2006/0236871 A1 | 10/2006 | Ternite et al. | | |
| 2006/0292012 A1 | 12/2006 | Brudevold et al. | | |
| 2007/0068395 A1 * | 3/2007 | Masek | B65D 85/8043 | 99/295 |
| 2007/0084352 A1 * | 4/2007 | Yuen | A47J 31/0631 | 99/295 |
| 2007/0144355 A1 * | 6/2007 | Denisart | B65D 85/8043 | 99/275 |
| 2007/0148290 A1 * | 6/2007 | Ternite | B65D 85/8043 | 426/90 |
| 2007/0186784 A1 * | 8/2007 | Liverani | B65D 85/8043 | 99/295 |
| 2007/0224319 A1 * | 9/2007 | Yoakim | B65D 85/8043 | 426/433 |
| 2008/0095904 A1 | 4/2008 | Sullivan et al. | | |
| 2008/0105131 A1 * | 5/2008 | Castellani | A47J 31/0673 | 99/295 |
| 2008/0115674 A1 | 5/2008 | Huang et al. | | |
| 2008/0125256 A1 | 5/2008 | Murayama et al. | | |
| 2008/0134902 A1 | 6/2008 | Zimmerman et al. | | |
| 2008/0216666 A1 * | 9/2008 | Doglioni Majer | A47J 31/0673 | 222/1 |
| 2008/0245236 A1 * | 10/2008 | Ternite | A47J 31/3623 | 99/295 |
| 2008/0317931 A1 * | 12/2008 | Mandralis | A23F 5/24 | 426/594 |
| 2009/0007794 A1 * | 1/2009 | Cortese | A47J 31/3628 | 99/289 R |
| 2009/0007796 A1 * | 1/2009 | Ricotti | A47J 31/0668 | 99/295 |
| 2009/0017177 A1 * | 1/2009 | Yoakim | A47J 31/0684 | 426/431 |
| 2009/0126577 A1 * | 5/2009 | Ternite | A47J 31/36 | 99/295 |
| 2009/0158938 A1 * | 6/2009 | Jarisch | A47J 31/3633 | 99/289 R |
| 2009/0175986 A1 * | 7/2009 | Doglioni Majer | B65D 85/8061 | 426/77 |
| 2009/0199518 A1 * | 8/2009 | Deuber | A47J 31/3628 | 99/300 |
| 2009/0205503 A1 * | 8/2009 | Cortese | A47J 31/3633 | 99/302 R |
| 2009/0255410 A1 * | 10/2009 | Jarisch | A47J 31/3638 | 99/289 R |
| 2009/0280219 A1 * | 11/2009 | Yoakim | A47J 31/3628 | 426/77 |
| 2010/0024658 A1 | 2/2010 | Jacobs et al. | | |
| 2010/0037779 A1 * | 2/2010 | Pecci | A47J 31/3628 | 99/289 R |
| 2010/0043644 A1 * | 2/2010 | Suggi Liverani | B65D 85/8043 | 99/295 |
| 2010/0043645 A1 * | 2/2010 | Suggi Liverani | A47J 31/0668 | 99/295 |
| 2010/0043646 A1 * | 2/2010 | Suggi Liverani | B65D 85/8043 | 99/295 |
| 2010/0064899 A1 * | 3/2010 | Aardenburg | B65D 85/8043 | 99/295 |
| 2010/0077928 A1 * | 4/2010 | Schmed | B65D 85/8043 | 99/295 |
| 2010/0101428 A1 * | 4/2010 | Fin | A47J 31/3638 | 99/295 |
| 2010/0129512 A1 * | 5/2010 | Accursi | A23F 5/262 | 99/302 R |
| 2010/0147156 A1 * | 6/2010 | Colantonio | A47J 31/3628 | 99/295 |
| 2010/0154647 A1 * | 6/2010 | Skalski | A47J 31/0668 | 99/290 |
| 2010/0154651 A1 * | 6/2010 | Skalski | A47J 31/407 | 99/302 R |
| 2010/0186599 A1 * | 7/2010 | Yoakim | B65D 85/8043 | 99/295 |
| 2010/0203208 A1 * | 8/2010 | Yoakim | B65D 85/8043 | 426/431 |
| 2010/0288131 A1 * | 11/2010 | Kilber | A47J 31/0673 | 99/295 |
| 2010/0303964 A1 * | 12/2010 | Beaulieu | A47J 31/446 | 426/77 |
| 2011/0030563 A9 * | 2/2011 | Doglioni Majer | A47J 31/0673 | 99/295 |
| 2012/0258210 A1 * | 10/2012 | Wong | A47J 31/3676 | 426/115 |
| 2013/0105340 A1 * | 5/2013 | Hother | A47J 31/3676 | 206/222 |
| 2013/0112576 A1 * | 5/2013 | Hother | C12P 7/08 | 206/222 |
| 2014/0020565 A1 * | 1/2014 | Nabeiro | B65D 85/8046 | 426/115 |
| 2014/0026761 A1 * | 1/2014 | Bartoli | A47J 31/0673 | 99/295 |
| 2014/0053735 A1 * | 2/2014 | Verbeek | A47J 31/3676 | 99/295 |
| 2014/0072675 A1 * | 3/2014 | Norton | B65D 85/8043 | 426/111 |
| 2014/0072676 A1 * | 3/2014 | Moutty | B65D 85/8043 | 426/112 |
| 2014/0123859 A1 * | 5/2014 | Verbeek | A47J 31/407 | 99/295 |
| 2014/0287105 A1 * | 9/2014 | Husband | B65D 65/466 | 426/115 |
| 2014/0318379 A1 * | 10/2014 | Perentes | B65D 85/8052 | 426/115 |
| 2014/0373725 A1 * | 12/2014 | Mastropasqua | B65D 1/0261 | 99/295 |
| 2015/0079241 A1 * | 3/2015 | Mahlich | A23F 5/26 | 426/115 |
| 2015/0108011 A1 * | 4/2015 | Bartoli | A47J 31/407 | 206/0.5 |

(56) References Cited

U.S. PATENT DOCUMENTS

| | | | | |
|---|---|---|---|---|
| 2015/0196159 A1* | 7/2015 | Spiegel | ............ | B65D 85/8043 |
| | | | | 99/295 |
| 2015/0203285 A1* | 7/2015 | Baldo | ............ | B65D 81/3211 |
| | | | | 426/112 |
| 2015/0246768 A1* | 9/2015 | Talon | ............ | B65D 85/8043 |
| | | | | 426/79 |

FOREIGN PATENT DOCUMENTS

| | | | | |
|---|---|---|---|---|
| CN | 101309840 A | 11/2008 | | |
| CN | 101410041 A | 4/2009 | | |
| CN | 101421172 A | 4/2009 | | |
| CN | 101048095 | 1/2011 | | |
| EP | 0 507 905 B1 | 10/1992 | | |
| EP | 1364605 A1 * | 11/2003 | ............ | A47J 31/3628 |
| EP | 1 775 234 | 7/2008 | | |
| EP | 2 298 671 | 3/2011 | | |
| GB | 1 256 247 A | 12/1971 | | |
| JP | 62-160005 | 7/1987 | | |
| JP | 62-188626 | 8/1987 | | |
| JP | 01-310612 A | 12/1989 | | |
| JP | 02-231043 | 9/1990 | | |
| JP | 06-015879 Y | 4/1994 | | |
| JP | 63-047890 | 12/1994 | | |
| JP | 2000-336570 | 12/2000 | | |
| JP | 2000-355375 A | 12/2000 | | |
| JP | 2001-061663 A | 3/2001 | | |
| JP | 2002-284238 | 10/2002 | | |
| JP | 2004-534697 | 11/2004 | | |
| JP | 2005-211659 | 8/2005 | | |
| RU | 2312803 | 12/2007 | | |
| WO | WO 2001/015582 A1 | 3/2001 | | |
| WO | WO-02/081337 A1 | 10/2002 | | |
| WO | WO-03/059778 A2 | 7/2003 | | |
| WO | WO-2004/064582 | 8/2004 | | |
| WO | WO-2006/030461 | 3/2006 | | |
| WO | WO-2006045537 A1 * | 5/2006 | ............ | B65D 85/8043 |
| WO | WO 2006/137737 A1 | 12/2006 | | |
| WO | WO-2007/114685 A1 | 10/2007 | | |
| WO | WO-2008/078990 | 7/2008 | | |
| WO | WO-2008/117329 A1 | 10/2008 | | |
| WO | WO-2008125256 A1 * | 10/2008 | ............ | B65D 85/8043 |
| WO | WO-2008132571 A1 * | 11/2008 | ............ | B65D 85/8043 |
| WO | WO-2009/006379 | 1/2009 | | |

OTHER PUBLICATIONS

Japanese Office Action and Translation thereof for Japanese Application No. 2012-516005, dated Jul. 9, 2013, 11 pages.

Japanese Utility Model Application Sho-62-160005/1987 (Japanese Utility Model Application Laid-Open No. Hei-01-66370/1989), 2 pages.

Notice of Opposition to European Patent No. EP2367736, held by Koninklijke Douwe Egberts B.V., dated Jun. 3, 2014, 26 pages.

Office Action for Chinese Application No. 200980160935.3, mail date Nov. 19, 2013, 12 pages.

Office Action for Chinese Application No. 200980160984.7, mail date Nov. 5, 2013, 22 pages.

Office Action for Japanese Patent Application No. 2012-516004, mail date Aug. 2, 2013, 5 pages.

Office Action for Russian Patent Application No. 2012101449 with English Translation, dated Mar. 20, 2014, 10 pages.

Patent Examination Report No. 1 for Australian Patent Application No. 2009347071, dated Jun. 30, 2014, 3 pages.

Search Report for Application No. 200980160985.1, mail date Aug. 30, 2013, 2 pages.

Search Report for Chinese Application No. 200980160935.3, mail date Nov. 8, 2013, 2 pages.

Search Report for Chinese Application No. 200980160984.7, mail date Oct. 28, 2013, 2 pages.

* cited by examiner

PRIOR ART

PRIOR ART

PRIOR ART

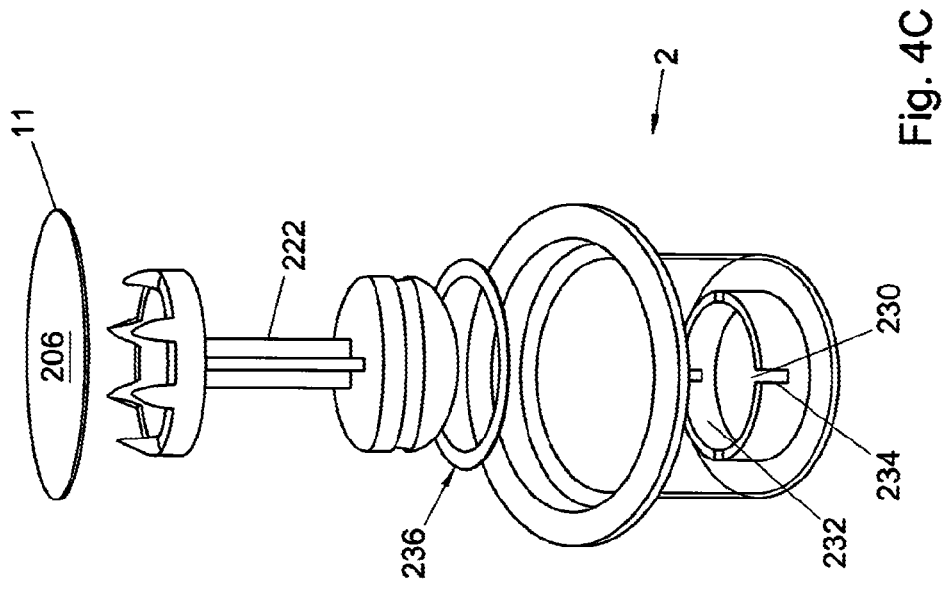
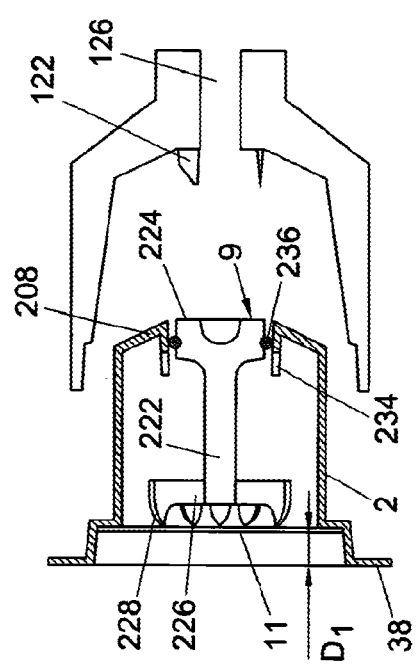
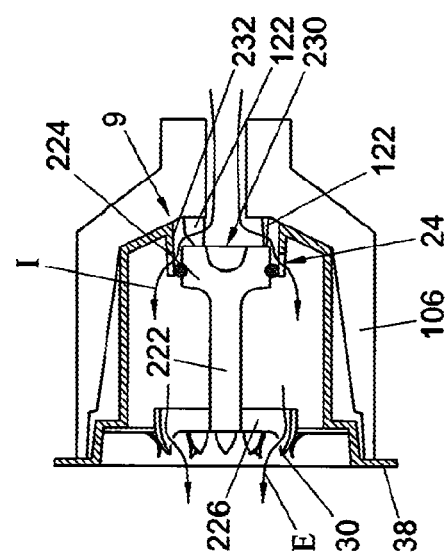
Fig. 4A
Fig. 4B
Fig. 4C

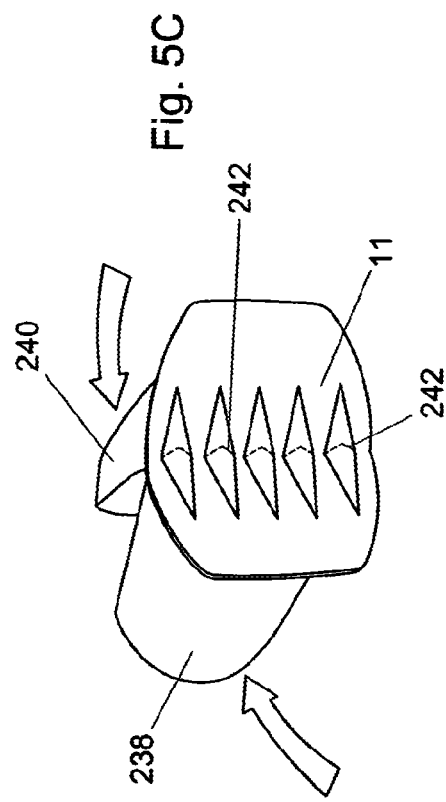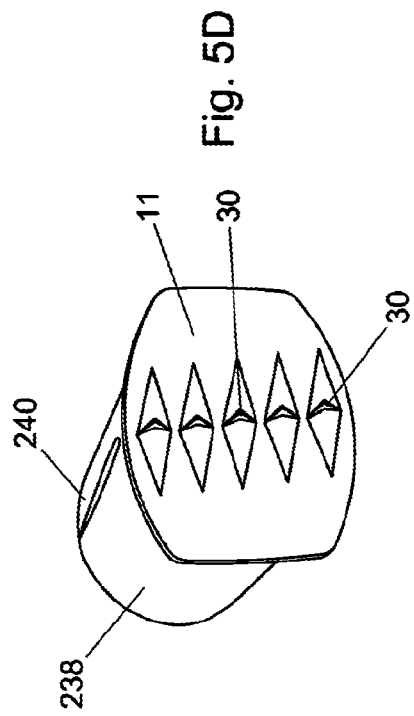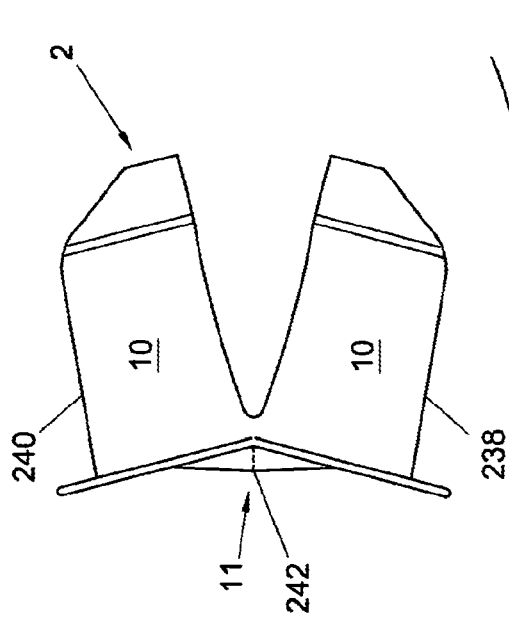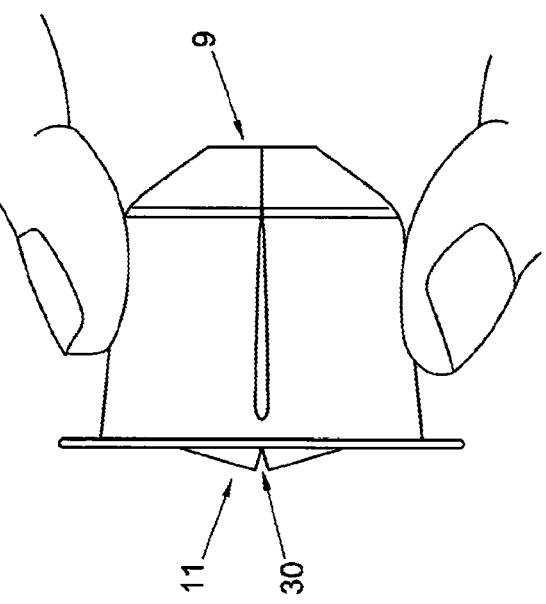

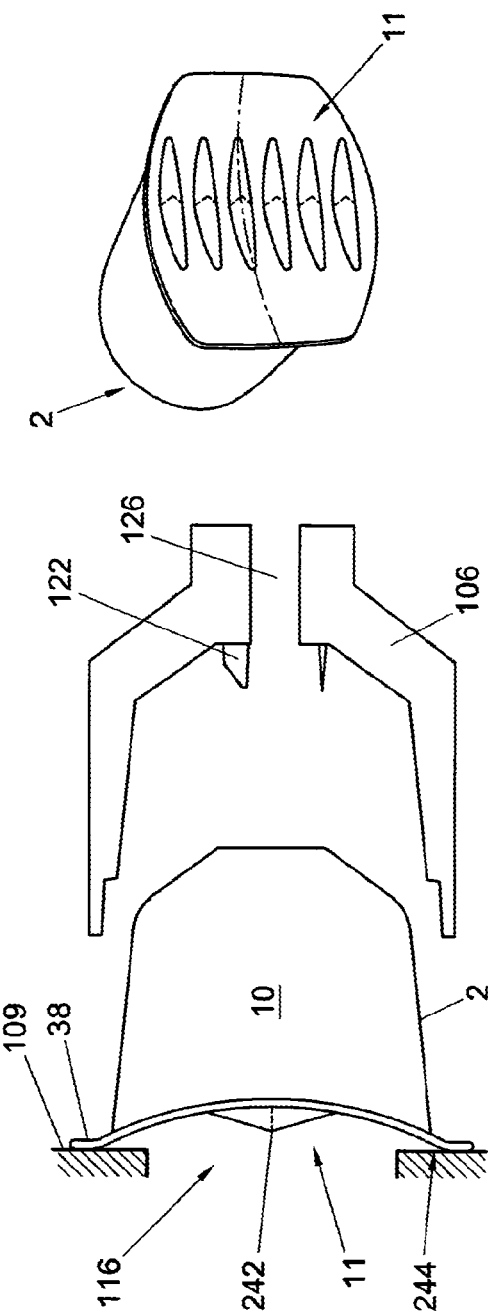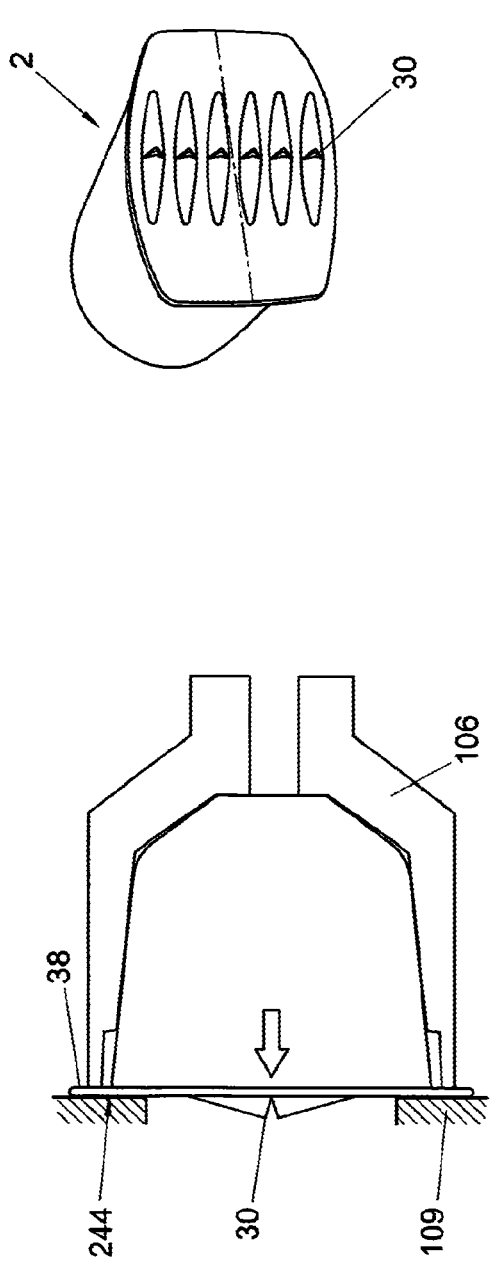

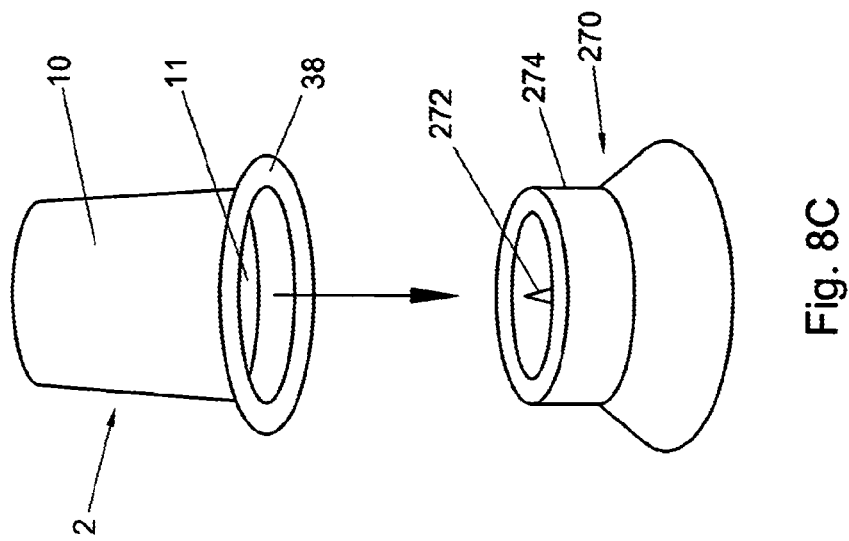
Fig. 8C
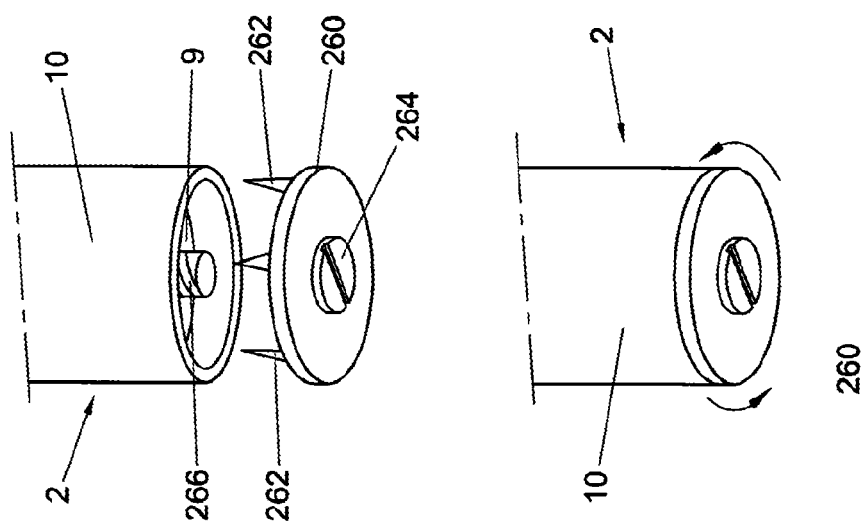
Fig. 8A
Fig. 8B

SYSTEM, CAPSULE AND METHOD FOR PREPARING A PREDETERMINED QUANTITY OF BEVERAGE

CROSS-REFERENCE TO RELATED APPLICATIONS

This application is a divisional of U.S. patent application Ser. No. 13/326,291 filed on Dec. 14, 2011 (which is hereby incorporated herein by reference); which is a continuation of International Patent Application Serial No. PCT/NL2009/050815 filed on Dec. 30, 2009 (which is hereby incorporated herein by reference); which claimed priority to European Application Nos. EP 09162982.4, EP 09162934.5, EP 09162998.0, EP 09162995.6, all filed on Jun. 17, 2009 (all of which are hereby incorporated herein by reference).

FIELD

The invention concerns a system for preparing a predetermined quantity of beverage suitable for consumption using an extractable product. The system comprises an exchangeable capsule and an apparatus. The apparatus comprises a fluid dispensing device for supplying an amount of fluid, such as water, to the exchangeable capsule, a receptacle for holding the exchangeable capsule, and an outlet arrangement for supplying the beverage to a container, such as a cup. The capsule comprises a circumferential wall, a bottom, a lid, and an entrance opening portion and an exit opening portion for respectively letting fluid in the capsule and dispensing the fluid from the capsule, of which at least one is closed to prevent fluid from passing the respective opening portion. The circumferential wall, the bottom and the lid enclose an inner space that comprises an extractable product. The system is arranged for bringing the fluid dispensing device in fluid connection with the entrance opening portion of the capsule for supplying the fluid to the extractable product for preparing the beverage. The system is further arranged so that, in use, the outlet arrangement is in fluid communication with the exit opening portion for draining the prepared beverage from the capsule.

The invention further concerns a capsule for holding an extractable product for dispensing beverage, comprising a circumferential wall, a bottom, a lid, and an entrance opening portion and an exit opening portion for letting fluid in the capsule and draining prepared beverage from the capsule, respectively, of which at least one opening portion is closed to prevent fluid from passing, wherein the circumferential wall, the bottom and the lid enclose an inner space that comprises an extractable product.

The invention also comprises a method of preparing a predetermined quantity of beverage suitable for consumption using an extractable product. The method comprises holding a capsule that comprises a circumferential wall, a bottom, a lid, an entrance opening portion, an exit opening portion, of which at least one of the opening portions is closed for inhibiting the passing of fluid.

BACKGROUND

In the art hermetically sealed capsules comprising ground coffee, for placement in a coffee dispensing apparatus, are known. During coffee preparation the entrance opening portion of such sealed capsule is pierced by knifes provided in the apparatus, so that entrance openings are provided for supplying fluid under pressure to the grounded coffee in the inner space of the capsule. This in turn causes the pressure in the inner space of the capsule to rise, such that an exit opening portion of the capsule is pressed against lid piercing means that are present in the apparatus. When sufficient pressure is applied, the exit opening portion will tear against the lid piercing means creating exit openings through which the coffee drink can drain from the capsule through an outlet present in the apparatus. In use, the outlet is in fluid communication with the exit opening portion of the receptacle so that coffee drink may flow through the outlet.

It has been found that in a system as explained above, preferential paths of fluid may flow through the extractable product within the capsule, e.g. from the at least one entrance opening to the at least one exit opening, which may lead to undesired strength of the prepared beverage and/or variations in strength of the prepared beverage, from one capsule to another. Moreover, since the exit openings are formed by fluid pressure, the number, position and/or size of the exit openings are formed by chance.

It is therefore one of the goals of the invention to provide for an alternative system, capsule and method.

SUMMARY

According to a first aspect, a system may comprise an apparatus and a capsule, wherein the apparatus may be arranged for providing fluid to the capsule and for draining beverage from the capsule. The capsule may comprise an extractable product for making beverage. The capsule according to the invention may comprise opening portions for letting fluid pass through the capsule, in particular an entrance opening portion for letting fluid into the capsule, and an exit opening portion for letting beverage out of the capsule. Before usage one or both of the opening portions may be closed so as to prevent the extractable product coming into contact with air. The respective opening portions may extend at least partly in the bottom and/or lid of the capsule.

The capsule according to the invention may have a movable portion arranged for providing at least one opening through the otherwise closed opening portion by being moved with respect to the respective opening portion. The moveable portion may be arranged separately, or at a distance, from the opening portion that has to be opened. The opening portion may be opened without piercing a part of the capsule with knives or lid piercing means provided in the apparatus. Rather, the opening portion may be opened by moving a part of the capsule itself, i.e. the movable portion.

The opening portion may comprise an additional feature or adjustment to the capsule, such as for example a cut out. In this description, a cut out may be understood as comprising a thinner section in a wall part of the capsule so as to be able to break open a respective wall part. The opening portion may be arranged so that the opening that is created by the moveable portion is of approximately predetermined size and may be provided at a predetermined location. In this way, the path of the fluid flowing through the extractable product, from the entrance to the exit opening portion, may be better controlled. Providing a movable portion for opening the capsule may provide for an easy way of opening the capsule before usage, while the capsule may be closed up until opening.

Equipping the capsule with at least one moveable portion and a corresponding opening portion may provide for a predetermined number of entrance and/or exit openings, a predetermined position thereof and/or a predetermined size, e.g. instead of mainly relying on inner fluid pressure of the capsule. Independent of the apparatus, the arrangement of openings may be pre-determined.

The number, position and/or size of the exit openings may for example be determined on the basis of the type of extractable product, the grain-size of the extractable product, the desired strength of the beverage, etc. The capsule that carries such extractable product may comprise one ore more opening portions that may provide for that predetermined number, position and/or size of openings. Furthermore, the opening portion may form entrance or exit openings, independent, or partly independent of the built-up pressure inside the capsule. Multiple opening portions may be provided.

Advantageously, the capsule may be sealed before being opened, preferably at least fluid and/or air tight, such that the extractable product may remain substantially in tact, preferably with little or no loss of flavour or extractability, during a relative long period before use. Therefore, the opening portions may be closed before use. Only just before use, or during use, the opening portion may be opened by the moveable portion so that beverage may flow through the capsule.

In an embodiment, the moveable portion is connected to the opening portion. By moving the moveable portion in a specific direction the opening portion is pulled and locally breaks so that an opening is provided. In a further embodiment, the circumferential wall comprises the moveable portion, and the opening portion is opened by moving a part of the circumferential wall towards an opposite part of the circumferential wall, the capsule being arranged so that by said movement a tension is created in the opening portion and the respective opening portion breaks open. For example, the lid or the bottom may break open. In another further embodiment, the opening portion is opened by at least partly bending the lid so that a tension is created in the exit opening portion which in turn may break open.

In one embodiment, the moveable portion is arranged to be activated manually, for example before placing the capsule in the apparatus. In another embodiment, the moveable portion may be arranged to be activated by the apparatus, for example during operation.

In an embodiment, the exit opening portion may be provided in the lid of the capsule, and/or in part of the circumferential wall. The exit opening portion may further comprise an exit filter for retaining the extractable product and draining the beverage. The entrance opening portion may be provided in the bottom of the capsule and/or in part of the circumferential wall. The entrance may comprise an entrance filter for allowing pressurized fluid to pass and retaining the extractable product.

In an embodiment, by moving the moveable portion the opening portion may tear, snap, break or otherwise open. The apparatus may be an apparatus according to the state of the art, for example such as described above. The apparatus may have moving elements, such as bottom piercing means and/or a receptacle. The moveable portion may be moved by the bottom piercing means and/or by the movement of the receptacle. The apparatus itself may push the movable portion to open the respective opening portion.

In an embodiment, the moveable portion may be arranged to provide an opening through the entrance opening portion for supplying the fluid to the capsule, in particular to the extractable product, and through the exit opening portion, for example at approximately the same time. One moveable portion may be provided to open the entrance and the exit opening portion, or at least one moveable portion may be provided to open the entrance opening portion and at least one separate moveable portion may be provided to open the exit opening portion.

The capsule may comprise a rigid rim and/or a rigid circumferential wall, so that the capsule may be supported by the receptacle. In use, the rim may be pressed between the receptacle and the outlet arrangement for holding the capsule in place while draining the beverage from the capsule.

In an embodiment, the receptacle comprises bottom piercing means intended for piercing the bottom of an alternative capsule for creating at least one entrance opening in the entrance opening portion of the alternative capsule, for supplying the fluid to the extractable product through said at least one entrance opening. The capsule of the system may be arranged so that, in use, the bottom of the capsule of the system is positioned at a distance from the bottom piercing means, such that it is not pierced by the bottom piercing means. The bottom may stay intact and/or may be opened by the movable portion.

In a further embodiment the receptacle comprises lid piercing means intended for piercing the exit opening portion of an alternative capsule when the exit opening portion is sufficiently pressed against the lid piercing means under the influence of pressure of the fluid and/or beverage in the capsule, so that at least one exit opening through which the beverage can drain from the alternative capsule is created in the exit opening portion. Preferably, the lid piercing means and the capsule of the system are adapted to each other such that the lid, in use, is not pierced by the lid piercing means. The lid may stay intact and/or may be opened by moving the movable portion.

The fluid dispensing device of the system may be arranged for supplying the fluid to the exchangeable capsule under a pressure of approximately 4-20 bars, preferably 5-18 bars, more preferably 6-15 bars. In an embodiment, a pressure of 6 bar is supplied to the capsule. For example, the extractable product may comprise coffee grains, and the system may be arranged for making an espresso and/or coffee type of beverage.

According to a second aspect, an exchangeable capsule is provided wherein the capsule is conceived to be opened by means of manually actuating the movable portion.

The arrangement of the capsule allows for a predetermined way of opening it so that fluid may pass through the capsule in a controlled manner, as explained above. By moving a part of the capsule with respect to the rest of the capsule, predetermined opening portions may open.

According to a third aspect, a method of preparing a predetermined quantity of beverage is provided wherein the method uses an exchangeable capsule in a system. The capsule comprises a circumferential wall, a bottom, a lid, and an entrance opening portion and an exit opening portion for letting fluid in the capsule and draining a prepared beverage from the capsule, respectively, of which at least one opening portion is closed to prevent fluid from passing, wherein the circumferential wall, the bottom and the lid enclose an inner space that comprises an extractable product. The capsule further comprises at least one moveable portion of the capsule that extends at a distance from the respective closed opening portion, and that is arranged to open the respective opening portion by being moved with respect to the respective opening portion. The exchangeable capsule may be sealed before use. The system comprises an apparatus comprising a fluid dispensing device for supplying an amount of fluid, such as water, to the exchangeable capsule, a receptacle for holding the exchangeable capsule, and an outlet arrangement for supplying the beverage to a container, such as a cup. The system is arranged for bringing the fluid dispensing device in fluid connection with the entrance opening portion of the exchangeable capsule for supplying the fluid to the extractable product for preparing the beverage. The system is further arranged so that, in use, the outlet arrangement is in fluid communication with the exit opening portion for draining the prepared beverage from the exchangeable capsule.

In this method, a capsule is used, which capsule comprises a movable portion that provides an opening through the opening portion, after which the prepared beverage can be drained from the capsule. Before use, the respective opening portion may be closed. During use, or just before use, the opening portion may be opened by moving the movable portion. Then, the fluid and/or beverage may pass through the capsule, in particular through the opening that was created by moving the movable portion. Beverage may flow out of the outlet arrangement, and preferably into a container such as a cup. By moving the movable portion, e.g. by pushing and/or bending it, the initially closed opening portion may be opened.

Further embodiments of the invention and advantages thereof may be set out in the claims and description, with reference to the drawings.

BRIEF DESCRIPTION OF THE DRAWINGS

In the drawings:

FIGS. 4A and B schematically show a part of the system in cross-sectional side view, wherein the capsule is in a closed and opened condition, respectively;

FIG. 4C schematically shows the capsule of FIGS. 4A and B in explosive view;

FIGS. 5A and B schematically show a capsule in side view, in closed and opened condition, respectively;

FIGS. 5C and D schematically show the capsule of FIGS. 5A and B in perspective view, in closed and opened condition, respectively;

FIGS. 6A and B schematically show a system in side view, in closed and opened condition, respectively;

FIGS. 6C and D schematically show the capsule of FIGS. 6A and 6B in perspective view, in closed and opened condition, respectively;

FIGS. 8A and B schematically show another capsule in perspective view;

FIG. 8C schematically shows yet another capsule in perspective view; and

DESCRIPTION OF EXEMPLARY EMBODIMENTS

Figure 1A:
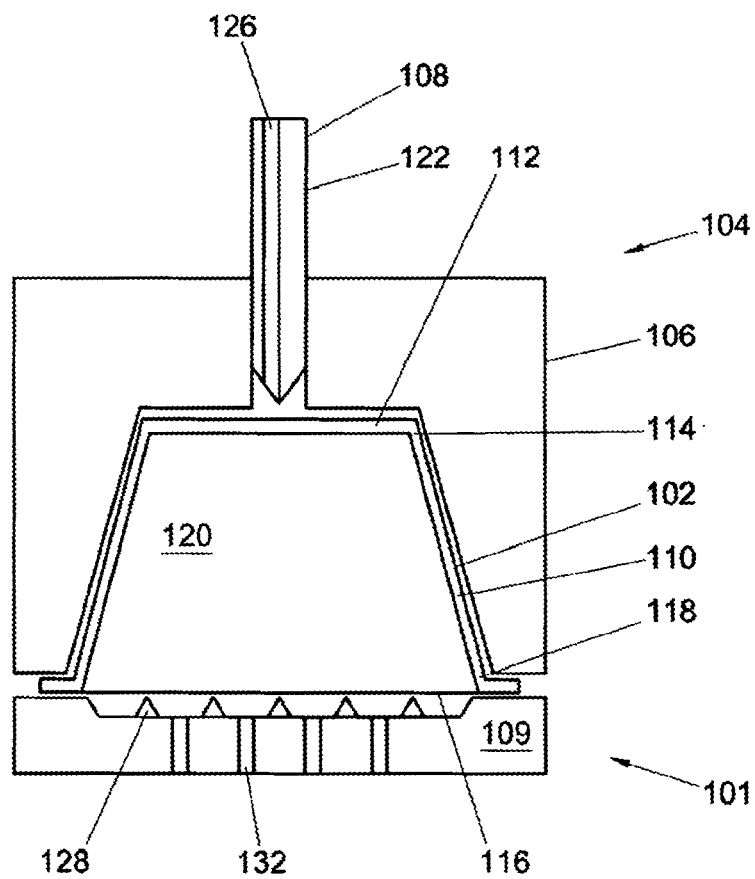
FIG. 1a-c schematically show a prior art system for preparing a beverage in cross-sectional front view.

In this description, identical or corresponding areas have identical or corresponding reference numerals. The exemplary embodiments shown should not be construed to be limitative in any manner and serve merely as illustration.

Figure 1B:
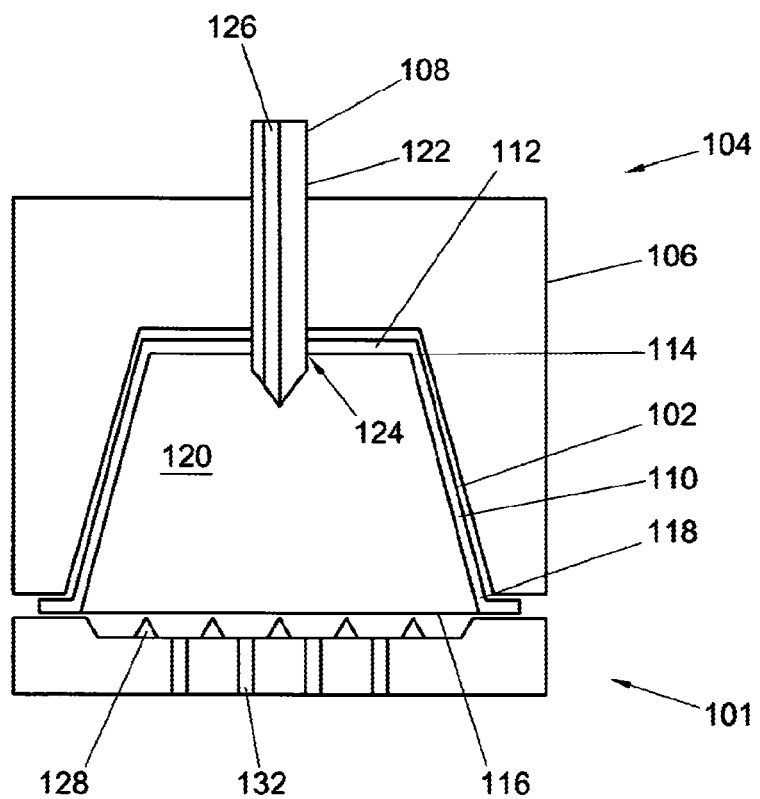
Figure 1C:
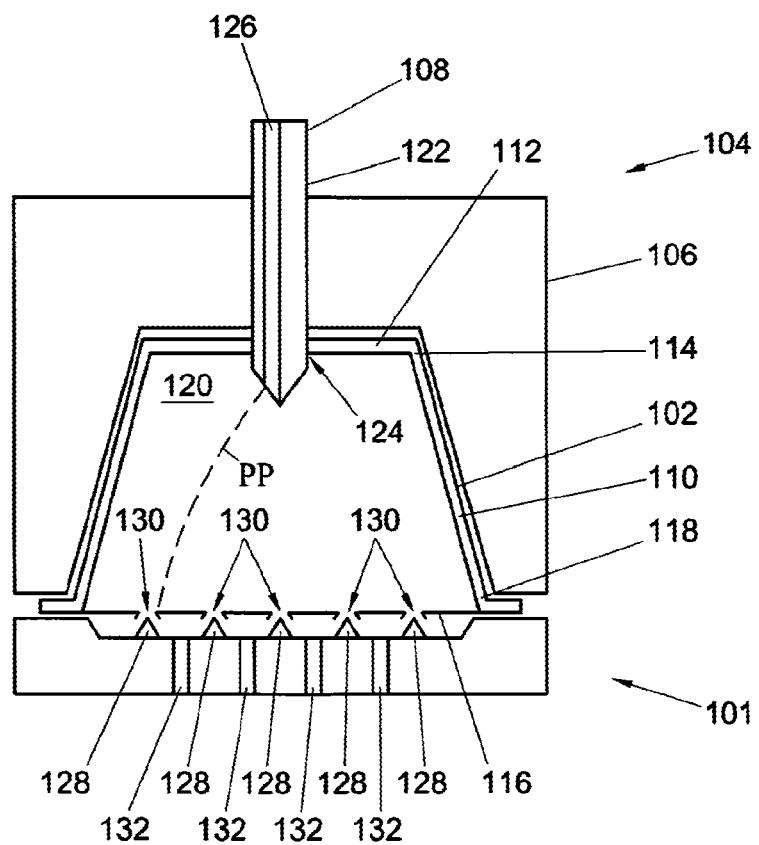

FIGS. 1a-1c show a prior art system 101 for preparing a predetermined quantity of beverage suitable for consumption using an extractable product. The system 101 comprises an exchangeable capsule 102, and an apparatus 104. The apparatus 104 comprises a receptacle 106 for holding the exchangeable capsule 102. In FIGS. 1a-1c a gap is drawn between the capsule 102 and the receptacle 106 for clarity. It will be appreciated that, in use, the capsule 102 may lie in contact with the receptacle 106. Commonly, the receptacle 106 has a shape complementary to the shape of the capsule 102. The apparatus 104 further comprises a fluid dispensing device 108 for supplying an amount of a fluid, such as water, under a pressure, of e.g. 9 bars, to the exchangeable capsule 102. Furthermore, an outlet apparatus 109 may be provided for providing fluid from the capsule 102 to a container such as a cup.

In the system 101 shown in FIGS. 1a-1c, the exchangeable capsule 102 comprises a circumferential wall 110, a bottom 112 closing the circumferential wall 110 at a first end 114, and a lid 116 closing the circumferential wall 110 at a second end 118 opposite the bottom 112. The circumferential wall 110, the bottom 112 and the lid 116 enclose an inner space 120 comprising the extractable product 20.

The system 101 of FIGS. 1a-1c comprises bottom piercing means 122 intended for piercing the capsule 102. FIG. 1a shows the bottom piercing means 122 in a retracted position. FIG. 1b shows the bottom piercing means 122 in an extended position for creating an entrance opening 124 in the bottom 112 for supplying the fluid to the extractable product 20 through the entrance opening 124. In FIGS. 1a-1c the piercing means 122 comprise a bore 126 through which the fluid can be supplied to the extractable product 20 contained in the inner space 120. The system 101 of FIGS. 1a-1c further comprises lid piercing means 128, here embodied as protrusions, intended for piercing the lid 116 of the capsule 102. In the shown embodiment, the lid piercing means 128 may form part of the outlet arrangement 109.

The system 101 shown in FIGS. 1a-1c is operated as follows for preparing a cup of coffee, wherein the extractable product 20 is roasted and ground coffee.

The capsule 102 is placed in the receptacle 106 (see FIG. 1a). The bottom piercing means are activated to pierce the bottom 112 of the capsule 102 (see FIG. 1b) for creating the entrance opening 124. The fluid, here hot water under pressure, is supplied to the extractable product 20 in the inner space 120 through the entrance opening 124. The water will wet the coffee grounds and extract the desired substances to form the coffee beverage.

During supplying the water under pressure to the inner space 120, the pressure inside the capsule 102 will rise. The rise in pressure will cause the lid 116 to deform and be pressed against the lid piercing means 128. Once the pressure reaches a certain level, the tear strength of the lid 116 will be surpassed and the lid will rupture against the lid piercing means 128, creating exit openings 130 (see FIG. 1c). The prepared coffee will drain from the capsule 102 through the exit openings 130 and outlets 132 of the outlet arrangement 109, and may be supplied to a container such as a cup (not shown).

During preparation of the beverage in the system 101 shown in FIGS. 1a-1c preferential flow paths may exist in the extractable product 20 inside the inner space 120 of the capsule 102. These preferential paths may extend from the entrance opening 124 to the exit openings 130. One such possible preferential path is indicated with line PP in FIG. 1c.

Figure 2:
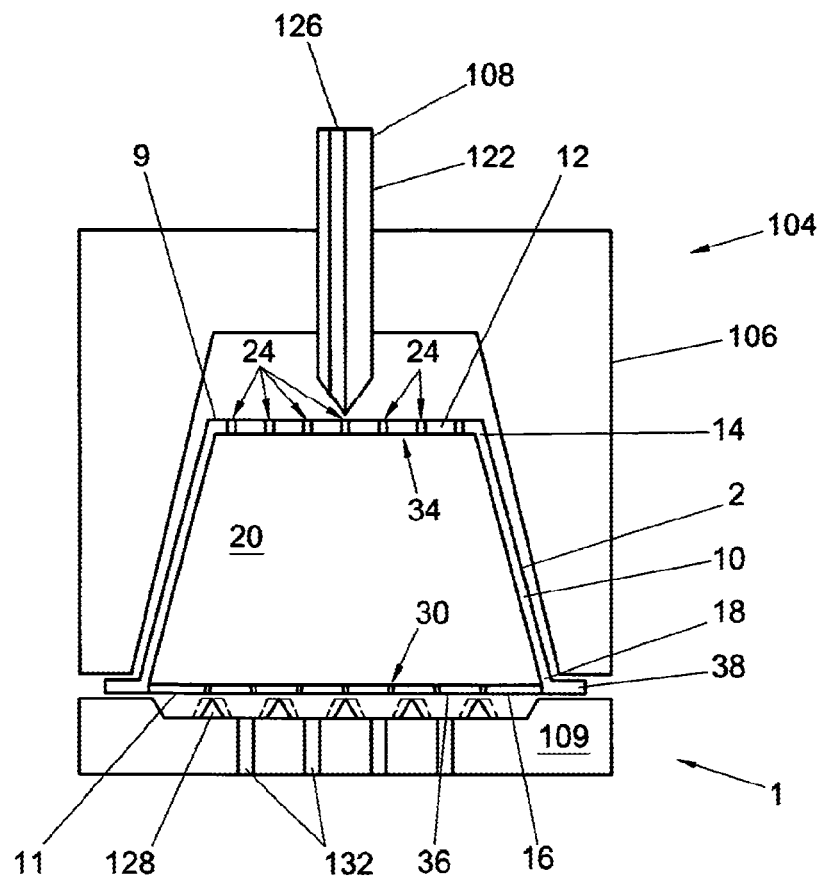
FIG. 2 schematically shows a system for preparing a beverage in cross-sectional front view.

FIG. 2 shows an example of a first embodiment of a system 1 for preparing a predetermined quantity of beverage suitable for consumption using an extractable product 20. The system 1 comprises an exchangeable capsule 2, and an apparatus 104. The capsule 2 is in an opened stated. The capsule 2 comprises opening portions 9, 11 in the bottom 12 and lid 16, respectively. The opening portions 9, 11 provide for entrance opening portions 9 and exit opening portions 11, respectively, for letting fluid pass through the capsule 2. In the shown embodiment, opening portions of the capsule 2 were already opened by moving movable portions, hence providing for entrance openings 24 and exit openings 30 in the respective opening portions 9, 11, respectively. The movable portions and opening portions are not shown in FIG. 2. However, the movable portions and opening portions are shown in FIG. 3-10.

The apparatus 104 comprises a receptacle 106 for holding the exchangeable capsule 2. In this example, the receptacle 106 has a shape complementary to the shape of the capsule 2. In FIG. 2 a gap is drawn between the capsule 2 and the receptacle 106 for clarity. It will be appreciated that, in use, the capsule 2 may lie in contact with the receptacle 106. The apparatus 104 further comprises a fluid dispensing device 108 for supplying an amount of a fluid, such as water, under pressure to the exchangeable capsule 2.

In the system 1 shown in FIG. 2, the exchangeable capsule 2 comprises a circumferential wall 10, a bottom 12 closing the circumferential wall 10 at a first end 14, and a lid 16 closing the circumferential wall 10 at a second end 18 opposite the bottom 12. The circumferential wall 10, the bottom 12 and the lid 16 enclose an inner space 20 comprising the extractable product 20. In this example, the exchangeable capsule 2 comprises an amount of extractable product 20 suitable for preparing a single portion of the beverage, preferably a single cup of the beverage, e.g. from 30-200 ml of the prepared beverage. The exchangeable capsule, thus, is a single-portion-pack.

According to an embodiment, the system 1 of FIG. 2 comprises bottom piercing means 122 intended for piercing the prior art capsule 102 as shown in FIGS. 1a-1c. FIG. 2 shows the bottom piercing means in an extended position, intended for creating the entrance opening 124 in the bottom 112 of the prior art capsule 102. According to a further embodiment, the opening portion 9 comprises an entrance filter 34 which is positioned at a distance from the bottom piercing means 12, such that the capsule 2 is not pierced by the bottom piercing means 122 and the bottom 12 stays intact when the bottom piercing means is brought in the extended position. The entrance filter 34 is provided with the entrance openings 24 that may be formed by moving the movable portions, as will be explained below. It will be appreciated that the pressure may be built up in the fluid dispensing device to a value of about 6 bars or higher.

In FIG. 2 the piercing means 122 comprise a bore 126 through which the fluid is supplied to an inner space of the receptacle 106. The fluid, here hot water under a pressure of e.g. more than 6 bars, will flow through the entrance filter 34 into the inner space 20 of the capsule 2 for extracting desired substances from the extractable product 20, in this example approximately 7 grams of roasted and ground coffee, for preparing, in this example the single cup of the beverage, here coffee.

In the example of FIG. 2, the entrance opening portion is provided in the bottom 12, and the system 1 is arranged for bringing the fluid dispensing device 108 in fluid connection with the entrance opening portion 9 for supplying the fluid to the extractable product 20 for preparing the beverage. The entrance opening portion 9 may be distinguished from the actual entrance filter 34 or entrance openings 24 by the fact that the entrance opening portion may be closed before usage.

In the example of FIG. 2, the circumferential wall 10 is substantially rigid. The circumferential wall may e.g. comprise a plastics material and may be formed by e.g. injection moulding, vacuum-forming, thermoforming or the like. In the example of FIG. 2 the bottom 12 is integral with the circumferential wall 10. In this example the entrance filter 34 is formed by a plurality of entrance openings 24 in the bottom 12. In this example the plurality of entrance openings 24 is distributed over substantially the entire bottom 12. In the shown embodiment, the fluid is supplied to the extractable product 20 via the plurality of entrance openings 24, which causes the extractable product 20 to be wetted over substantially the entire cross section of the capsule 2. Hence, a very homogeneous supply of fluid to the extractable product 20 is obtained. Thus, the risk of occurrence of preferential paths via which the fluid flows through the extractable product 20 is greatly reduced. In another embodiment, additional openings 24 may be provided in the circumferential wall 10, preferably near the bottom 12, so that the entrance opening portion may be provided along the bottom 12 and along the circumferential wall 10.

In a further embodiment, which may be used in addition to the above described embodiments or separate thereof, the system 1 of FIG. 2 comprises lid piercing means 128 intended for piercing the lid 116 of the prior art capsule 102 when the lid 116 sufficiently presses against the lid piercing means 128 under the influence of the pressure of the fluid and/or beverage in the capsule 102 for creating at least one exit opening 130 through which the beverage can drain from the prior art capsule 102. The exit filter 36 may be arranged to have sufficiently high tear strength not to be pierced by the lid piercing means 128 under the influence of the pressure inside the capsule 2. Alternatively, or additionally, the exit filter 36 forms a sufficiently low flow resistance for the beverage exiting the capsule 2, that the exit filter 36 is not pressed against the lid piercing means 128 with sufficient force to be pierced by the lid piercing means 128. Preferably, the lid 12 may stay intact or be opened by moving movable portions. The exit filter 36 and the lid piercing means 128 may be adapted to each other such that the capsule 2, in use, is not pierced by the lid piercing means 128, but rather, openings are formed by moving the moveable portions of the capsule 2.

According to an embodiment of the invention, the capsule 2 comprises an exit filter 36, comprising exit openings 30 through which the beverage can drain from the capsule 2. As will be explained below, the capsule may be provided with exit opening portions for opening these exit openings 30 prior to, or during, usage.

In the example of FIG. 2 the exit filter 36, forming an exit opening portion of the capsule 2, through which the beverage, here coffee, can drain from the capsule, is formed by a porous sheet, such as filter paper. In this example the entire lid 16 is formed as the exit filter 36. In the example of FIG. 2, the capsule 2 comprises an outwardly extending rim 38 at the second end 18, wherein the lid 16 is attached to the outwardly extending rim 38, e.g. by gluing, welding or the like. Hence, in this example the exit filter 36, i.e. the porous sheet, is attached to the outwardly extending rim 38.

In this example the exit filter 36 forms a substantially continuous fluid-permeable sheet spanning substantially the entire second, open end 18 of the capsule 2. Thus, the fluid can drain from the capsule 2 over a large area. Hence, a very homogeneous drain of beverage from the extractable product 20 is obtained. Thus, the risk of occurrence of preferential paths via which the fluid flows through the extractable product 20 is greatly reduced.

In an embodiment, parameters of the exit filter 36 of the capsule 2 of the system 1 can be chosen such that the exit filter 36 does not tear or rupture, e.g. has the sufficiently high tear strength and/or forming the sufficiently low flow resistance not to be pierced or torn. It will be appreciated that the lid and/or the exit filter 36 may deform against the lid piercing means, although it will not rupture or be torn. When the exit filter 36 is e.g. made of filtering paper, parameters of the filtering paper, such as density, thickness and/or PE-content, can easily be chosen to provide the exit filter 36 having the sufficiently high tear strength and/or forming the sufficiently low flow resistance. Alternatively, when the exit filter 36 is e.g. formed by a polymeric film provided with a plurality of exit openings, parameters of the polymeric foil, such as density, thickness, number of exit openings, size and/or shape of exit openings, can easily be chosen to provide the third wall having the sufficiently high tear strength and/or forming the sufficiently low flow resistance.

In the example of FIG. 2, the lid piercing means 128 are shown having sharp toothed points intended for piercing the lid. It will be appreciated that, alternatively, the lid piercing means 128 may have blunt piercing surfaces, e.g. as indicated with dashed lines in FIG. 2. In such embodiment, the prior art capsule 102 may, nevertheless, be pierced by the blunt piercing means 128, e.g. when the lid 116 consists of a sheet of aluminium foil. Parameters of the exit filter 36 of the capsule 2 of the system 1 according to an embodiment of the invention can be chosen such that the exit 36 filter has the sufficiently high tear strength and/or forms the sufficiently low flow resistance not to be pierced or torn. It will be appreciated that when the lid piercing means are blunt, the parameters of the exit filter may be chosen to suit these blunt piercing means. When the piercing means are blunt, the exit filter may e.g. be thinner than when the lid piercing means are sharp, while guaranteeing that the exit filter has the sufficiently high tear strength and/or forming the sufficiently low flow resistance not to be pierced or torn.

It is possible that the lid piercing means comprise ridges against which the lid, in use, abuts. Such ridges may be formed by the blunt piercing means 128 as shown with dashed lines in FIG. 2. The ridges may e.g. form at least 10%, possibly at least 25% of the portion of the surface of the receptacle 106 which, in use, coincides with the portion of the surface area of the lid 16 overlying the second, open, end 18. Hence, in use, the lid 16 may be supported by the ridges over, e.g. at least 10%, preferably at least 25%, of the portion the surface area of the lid 16 overlying the second, open, end 18. As already indicated, the lid 116 of the prior art capsule 102 may be pierced by such ridges, whereas parameters of the exit filter 36 of the capsule 2 of the system 1 according to an embodiment of the invention may easily be chosen such that the exit filter 36 has the sufficiently high tear strength and/or forms the sufficiently low flow resistance not to be pierced or torn. It will be appreciated that when the lid piercing means comprise ridges, the parameters of the exit filter may be chosen to suit such lid piercing means.

In the example of FIG. 2, the ridges comprise edges which are not sharp. In this example a radius of curvature of the edges is approximately 50 μm, although other radii are conceivable, such as 100, 200 or 500 μm. The prior art capsule 102 may, nevertheless, be pierced by the blunt piercing means 128, e.g. when the lid 116 consists of a sheet of aluminium foil. It will be appreciated that when the lid piercing means comprise non-sharp edges, the parameters of the exit filter 36 may be chosen to suit such lid piercing means. Parameters of the exit filter 36 of the capsule 2 of the system 1 according to an embodiment of the invention can be chosen such that the exit filter 36 has the sufficiently high tear strength and/or forming the sufficiently low flow resistance not to be pierced or torn.

It is also possible that the ridges of the lid piercing means 128 have a convex top against which the lid 16 abuts. Hence, when the lid 16, in use, is pressed against the ridges, the surface area over which the lid is supported by the ridges increases, thus reducing the local pressure exerted on the lid by the ridges. Thus it is possible to provide, in an easy manner, that the lid 12, in use, does not tear and/or rupture and stays intact. Before the capsule 2 is positioned in the receptacle 106, the capsule 2 may be sealed, so that the extractable product 20 may remain in tact until preparation of the beverage.

The material of the capsule 2 may comprise cellulose, paper, cotton, and/or starch-based products. For example, the material of the capsule 4 may comprise biodegradable material. In another embodiment, the material of the capsule 4 may comprise plastics. The bottom 12 and the lid 14 may comprise an entrance and an exit filter 34, 36, respectively. The capsule 4 may for example be shaped by injection moulding, vacuum-forming, thermoforming, compression moulding, or the like. In the above description, integrally shaped may be understood as comprising that the respective parts of the capsule 2 are formed approximately at the same time, in one form process. For example, the respective parts may be moulded in the same mould. In another embodiment, different parts may be heat-sealed, glued or welded to form the capsule 2.

At least one of the filters 34, 36 may comprise a porous fluid permeable sheet. At least one of the filters 34, 36 may comprise filtering paper and/or polyethylene (PE) fibres. Substantially the whole surface of the bottom 12 and/or lid 14, at least for the part extending inside the circumferential wall 10, may be fluid permeable. The filters 34, 36 may also be made to be permeable when waters supplied under a specific pressure, for example a pressure of at least 6 bars. For example, at lower pressures fluid will not flow through the filter 34, 36. At least one of the filters 34, 36 may be flexible. The filter 34, 36 may comprise a polymeric foil.

FIG. 3A-D shows a capsule having a first movable portion 200 for opening an entrance opening portion 9 and a second movable portion 202 for opening an exit opening portion 11. In the example, the opening portions 9, 11 may comprise foils 204, 206, respectively. In the shown example, the first movable portion 200 and the second movable portion 202 are arranged to open the opening portions 9, 11, respectively, by a piercing action. The first movable portion 200 may comprise a movable piercing structure, having piercing elements 210. The second movable portion 202 may comprise a movable piercing structure, having piercing elements 210. The second movable portion 202 may comprise a movable piercing structure, having piercing elements 212.

The second movable portion 202 may comprise an external piercing structure arranged to pierce the exit opening portion 11. The second movable portion 202 may comprise exit openings 216 for draining beverage out of the capsule 2. The first movable portion 200 may comprise an internal piercing structure that extends in the inner space of the capsule 2, arranged to pierce the entrance opening portion 9. As can be seen, the movable portions 200, 202 and the opening portions 204, 206 may comprise separate parts and may initially extend at a distance from each other.

The second movable portion 202 is arranged to be moved in the direction of the exit opening portion 11, at least until the piercing elements 212 pierce the exit opening portion 11. The exit opening portion 11 may extend at a distance d1 from the top rim 38 of the capsule 2, to allow the second movable portion 202 to pierce the exit opening portion 11 when it is pushed in the direction of the exit opening portion 11.

Figure 3C:
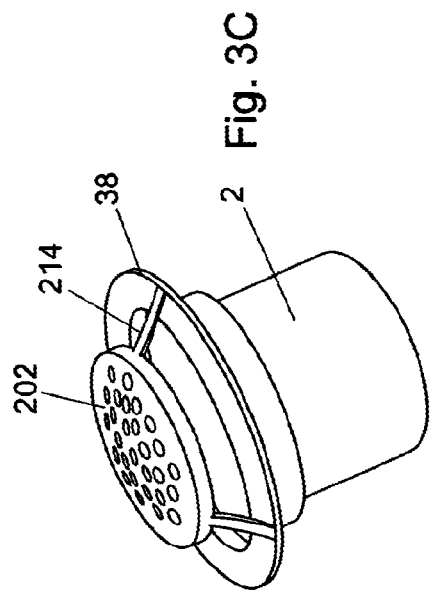
FIGS. 3C and D schematically show the capsule of FIGS. 3A and B in perspective view, in closed and opened condition, respectively.
Figure 3D:
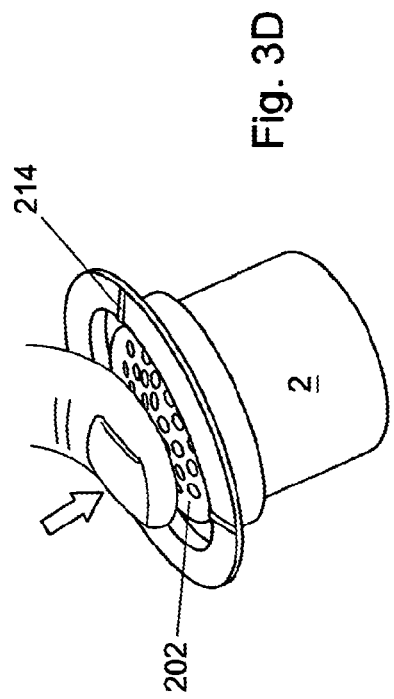
FIGS. 3A and B schematically show a capsule in cross-sectional side view, in closed and opened condition, respectively.
Figure 3A:
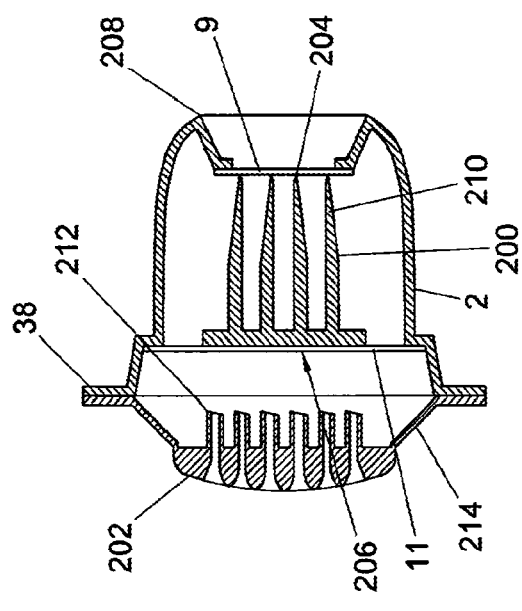
Figure 3B:
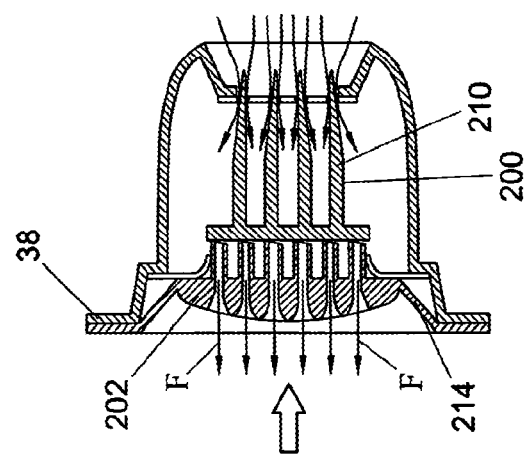

The second movable portion 202 may comprise bendable support elements 214 that initially support the movable portion 202 at a distance d1 from the exit opening portion 11. Initially the bendable support elements 214 may be in a stretched condition, wherein the bendable support elements 214 may support the second movable portion 202 so that the exit opening portion 206 remains closed, as shown in FIGS. 3A and 3C. By pushing the second movable portion 202 in the direction of the exit opening portion 206 the bendable support elements 214 may bend, until the second movable portion 202 pierces the exit opening portion 11, as shown in FIGS. 3B and 3D. The bendable support elements 214 may then be stretched in the other direction (FIG. 3B) and/or may inhibit further movement of the second movable portion 202. When the exit opening portion 11 has been pierced fluid may pass through the exit openings 216 in the second movable portion 202, as indicated by arrows F.

The first movable portion 200 may extend within the capsule 2. In the capsule 202, the first movable portion 200 may be arranged to be pushed by the second movable portion 202. The first movable portion 200 may comprise a push surface 218 near the exit opening portion 11, so that the second movable portion 202 can push the first movable portion 200 when it pierces through the exit opening portion 11. The first movable portion 200 may comprise piercing elements 210 having ends that extend near the entrance opening portion 9. The movable portions 200, 202 may be arranged so that when the second movable portion 202 pushes the first movable portion 200 the piercing elements 210 of the first movable portion 200 may pierce through the entrance opening portion 9, as shown in FIG. 3B. In this way, one or more entrance openings 220 may be created so that fluid may pass into the capsule 2. The entrance opening portion 9 may extend at a distance from the bottom edge 208 so as to prevent bottom piercing bottom piercing means 122 to pierce the entrance opening portion 9.

As shown in FIG. 3D, the movable portions 202, 204 may be activated manually. The movable portions 202, 204 may also be activated by the apparatus 104, for example by the movement of the receptacle with respect to the outlet arrangement 109. In another embodiment, the first movable portion 200 may comprise an external piercing structure and/or the second movable portion 202 may comprise an internal piercing structure.

In FIG. 4A-C a capsule 2 and a part of a receiving apparatus 104, in particular a receptacle 106 and bottom piercing means 122. The capsule 2 is provided with an internal movable portion 222. The internal movable portion 222 may extend approximately from the bottom 112 of the capsule 2 to the lid 116. The capsule 2 may be provided with an exit opening portion 11, which may comprise a foil, paper, sheet or seal or the like. The capsule 2 may further comprise an entrance opening portion 9. The internal movable portion 222 may have a first end 224 and a second end 226. The entrance opening portion 9 may be formed by the first end 224 of the internal movable portion 22 and the bottom edge 208 of the capsule 2. The second end 226 of the internal movable portion 22 may comprise a piercing structure 228 having one or more piercing elements such as nails, needles, blades, sharp edges or the like.

The first end 224 may be arranged to be abutted by the bottom piercing means 122 of the apparatus 106, as can be seen from FIG. 4B. The bottom 112 of the capsule 2 may be provided with a hole 230 in which the first end 224 may fit. The first end 224 may be arranged to seal the hole 230. The first end 224 may be provided with a sealing ring 236 for closing the hole 230 preferably fluid and/or gas tight. The hole 230 may have an inner wall 232 and/or edge. The inner wall 232 of the hole 230 and the first end 224 may be arranged such that the inner wall 232 may guide the internal movable portion 222 during movement. The inner wall 232 may also be provided with inlet slots 234. In use, when the receptacle 106 moves towards the outlet arrangement 109, the bottom piercing means 122 may push the internal movable portion 222 towards the exit opening portion 11, so that entrance openings 24 may be created between the internal movable portion 222 and the inner wall 232. For example, the first end 224 may release at least a part of the inlet slots 234 while moving in the direction of the exit opening portion 11, so that fluid may enter the capsule 2 through the inlet slots 234, as indicated by arrows I (FIG. 4B).

The internal movable portion 222 is arranged so that the second end 226 pierces the exit opening portion 11 when the internal movable portion 222 is moved in the direction of the exit opening portion 11. Hence, at least one exit opening 30 may be created by the piercing action so that beverage may flow through the exit opening 30, as indicated by arrows E in FIG. 4B. As can be seen from FIG. 4C, for manufacturing the capsule 2 the internal movable portion 222 may be positioned in the capsule 2, optionally with the aid of a sealing ring 236 that may abut the hole 230. The inner space of the capsule 2 may be filled with extractable product such as coffee grains, whereafter the exit opening portion 11, which may have the form of a foil 206, may be placed on the capsule 2 for sealing purposes and/or to function as a lid. The exit opening portion 11 may extend at a distance D1 from the rim 38 to prevent being pierced by the lid piercing means 128.

FIG. 5A-D show a capsule 2, wherein the circumferential walls comprises two movable portions 238, 240 that may be moved with respect to each other, for example from a position wherein the opposite moveable portions are distanced from each other (FIG. 5A) to a position wherein the circumferential walls may approximately abut (FIG. 5B). In the shown embodiment, the capsule inner space may comprise two cavities for containing extractable product. The moveable portions 238, 240 may be connected to the exit opening portion 11 such that by moving the movable portions 238, 240, the exit opening portion 11 is put under tension or stretched. The exit opening portion 11 may be provided with cut outs 242 so that when the exit opening portion 11 is stretched it may break open near the cut outs 242. Then, exit openings 30 may be created where the cut outs 242 were situated. This capsule 2 may be suitable to be opened manually, before placing the capsule 2 in the apparatus 104.

FIG. 6A-D shows a capsule 2, wherein the rim 38 and/or the outside of the lid 116 may comprise the movable portion 244. The movable portion 244 is arranged such that by moving the movable portion 244 a tension is created in the exit opening portion 11. The exit opening portion 11 may comprise cut outs 30. The cut outs 30 may break open when a tension is created in the exit opening portion 11, for example according to the same principle as explained with reference to FIG. 5A-D. In general, by moving the receptacle 106 with the capsule 2 in the direction of the outlet arrangement 109, the apparatus 104 may deform a local part of the capsule 2, which deformation may cause local tearing and/or breaking of the capsule 2 through the exit area and/or the entrance area, preferably without being pierced by parts of the apparatus but rather by the design of the capsule 2 itself.

Before being activated, the movable portion 244 may comprise a curve. When the movable portion 244 has that curve, in principle no or little tension may be present in the exit opening portion 11. By pushing the rim 38 against the outlet arrangement 109, the initial curve of the moveable portion 244 may be flattened, so that a tension is created in the exit opening portion 11. This capsule 2 may be suitable to be opened in the apparatus 104.

In certain embodiments, for example the embodiments shown in FIGS. 5A-D and 6A-D or the like, the entrance opening portions 9 may be opened in any suitable manner.

Figure 7C:
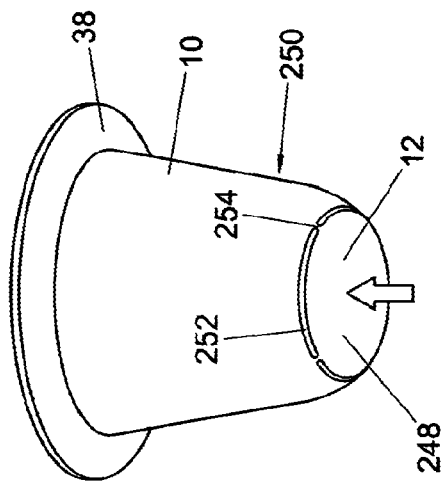
FIGS. 7C and D schematically show the capsule of FIGS. 7A and B in perspective view, in closed and opened condition, respectively.
Figure 7D:
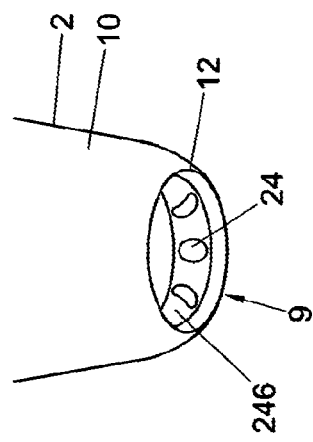
FIGS. 7A and B schematically show a system in cross-sectional side view, in closed and opened condition, respectively.
Figure 7A:
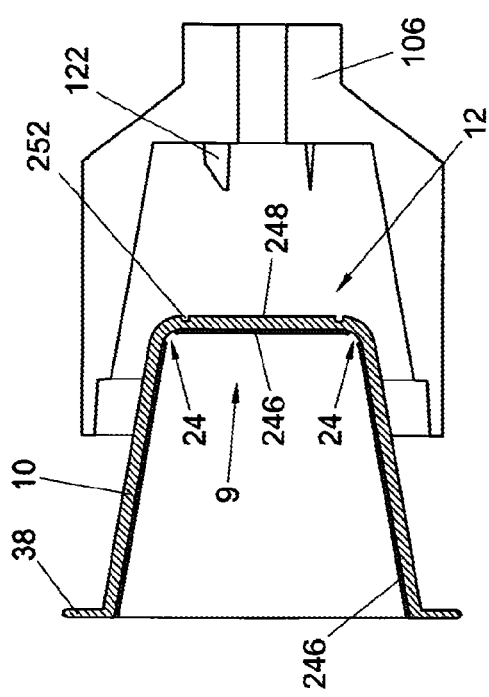

In FIG. 7A-D a capsule 2 is shown that is provided with an entrance opening portion 9. FIGS. 7A and 7C show the capsule 2 before the entrance opening portion 9 is opened. The entrance opening portion 9 may comprise a seal or foil 246. The seal or foil 246 may be arranged against the inner circumferential wall 10 and the bottom 12 of the capsule 2. The seal or foil 246 may comprise an internal foil lining. The entrance opening portion 9 is provided with entrance openings 24. The entrance openings 24 may comprise openings in the seal or foil 246. Initially, before opening the capsule 2, the entrance openings 24 may be closed. The entrance openings 24 may for example extend against a part of the circumferential wall 10 and/or bottom 12 of the capsule 2, so that the wall 10 and/or bottom 12 closes off the openings 24 and fluid is initially prevented from passing.

Figure 7B:
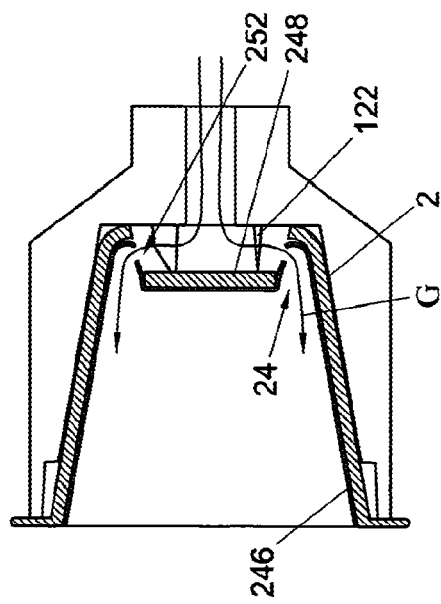

The capsule 2 may comprise a movable portion 248 that is arranged to open the entrance opening portion 9 by being moved. The moveable portion 248 may form at least a part of the bottom 12. In this description, the bottom 12 may be understood as including a lower part 250 of the circumferential wall 10. The moveable portion 248 may be arranged to be moved towards the exit area portion 11, preferably by the movement of the bottom piercing means 122. The movable portion 248 may comprise cut outs 252 so as to allow the movable portion 248 to move with respect to the circumferential wall 10 and/or bottom 12. Movable portion support parts 254 may be provided between the cut outs 252. The movable portion support parts 254 may comprise frangible bridges and/or relatively thin wall sections or the like. By pushing the movable portion 248 the movable portion support parts 254 may break so that the movable portion 248 can be moved in the direction of the exit opening portion 11, as shown in FIGS. 7B and 7D.

By moving the movable portion 248 inwards into the inner space of the capsule 2 a gap may be created between the bottom 12 or circumferential wall 10 and the movable portion 248. In principle, by moving the movable portion 248, the bottom 12 breaks open. As shown the bottom piercing means 122 may push the movable portion 248, preferably without piercing the movable portion 248 or the entrance opening portion 9. The entrance opening portion 9 may be arranged against the movable portion 248. The entrance opening portion 9 may be moved together with the movable portion 248. Hence, the entrance openings 24 may be moved at least partly away from the circumferential wall 10 and/or bottom 12 so that they may be exposed to incoming fluid, and fluid may pass through the entrance openings 24, as indicated by arrows G in FIG. 7B. As can be seen, the inner lining may partly let go of the wall of the capsule 2 so that the entrance openings 24 are situated at abovementioned gap 256 between the bottom 12 or circumferential wall 10 and the movable portion 248.

According to the same principle, a second movable portion may be provided that is lined with an exit opening portion, which may comprise a foil lining (not shown). The exit opening portion 11 may comprise exit openings 30 that are sealed by the inner wall of the capsule 2, for example the circumferential wall 10 or lid 16. By letting the lid piercing means 128 push the second movable portion into the capsule 2 a gap may be created between the second movable portion and the lid 16 or circumferential wall 10, so that the exit openings 30 may be released from the inner wall and fluid may flow through exit openings in the same manner as described above for the entrance openings 24.

In FIG. 8A-C embodiments are shown wherein the movable portion 260 may comprise a rotation or pushing cutting device. The movable portion 260 may be arranged to cut open an entrance opening portion 9. The movable portion 260 may comprise pierce and/or cut elements 262, such as knifes, pins or the like. The movable portion 262 may be positioned at the bottom 12 of the capsule (FIG. 8A, 8B). The pierce elements 262 may be arranged against or at a small distance from the entrance opening portion 9. By turning the movable portion 260 and/or pushing it inside the capsule 2, the pierce elements 262 may cut open the entrance opening portion 9 so that entrance openings 24 are created. The capsule 2 may comprise an axis 266 for allowing the movable portion 260 to be turned about the axis 266. The axis 266 may comprise a screw-like axis so that the movable portion 260 is moved in the direction of the inside the capsule 2 while being rotated. The movable portion 260 may comprise an engaging element 264 to be engaged manually, or by a tool or apparatus, for moving and/or turning the moving portion 260. In one embodiment, the movable portion 260 may be taken off after the capsule 2 is opened and before it is place in the apparatus 104, so that the fluid may be delivered to the extractable product in the capsule 2. In another embodiment, the movable portion 260 may comprise openings for letting fluid pass through. In a further embodiment, a similar movable portion may be arranged to open the exit opening portion.

In FIG. 8C, the movable portion 270 and the capsule 2 may form a kit. The movable portion 270 is arranged to open the respective opening portion separate from the apparatus 104, before placing the capsule 2 in the apparatus 104 for dispensing beverage from the capsule 2. The movable portion 270 may be arranged to be moved with respect to the capsule 2 for opening the respective opening portion. The movable portion 270 may comprise a piercing and/or cutting element 272. The movable portion 270 may comprise a guiding portion 274 for guiding the capsule 2 so that the opening portion is pierced by the respective piercing element 272 in a preferably predetermined manner. The capsule 2 may be moved over the movable portion 270 (so that the movable portion 270 moves with respect to the capsule 2) so that the respective opening portion is pierced. In the shown example, in usage, the inner wall of the capsule 2 may be guided along the guiding portion 274 of the movable portion 270 and the exit opening portion 11 may then be pierced by the piercing element 272 so that an exit opening 30 may be created. The capsule 2 may then be lifted from the movable portion 270 and be placed in the apparatus 104 for dispensing beverage. The fluid may pass through the respective openings.

Figure 9:
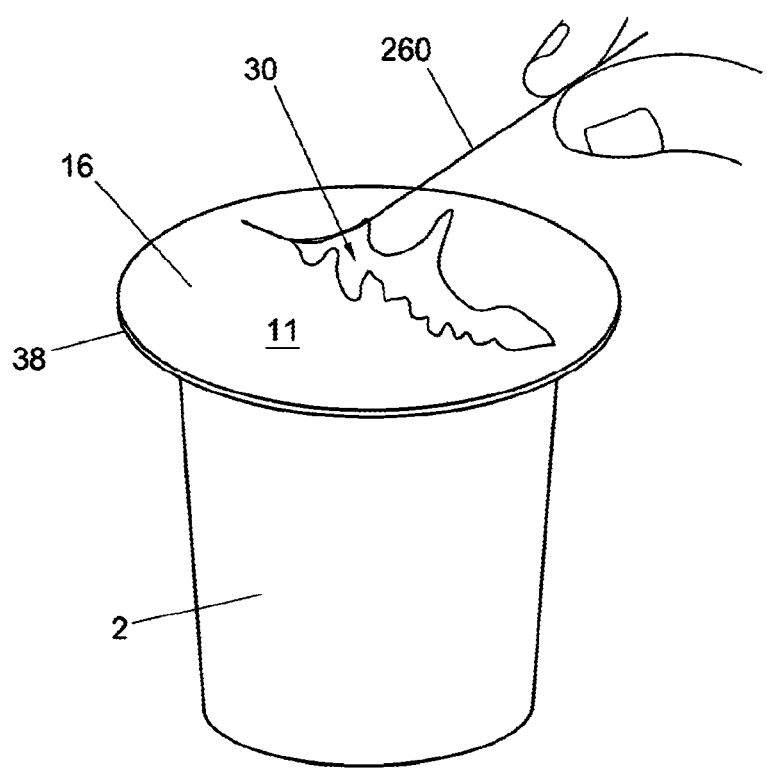
FIG. 9 schematically shows yet another capsule in perspective view.

In FIG. 9 a capsule 2 is shown, wherein the movable portion 268 is attached to the opening portion, in the shown example the exit opening portion 11. The exit opening portion 11 may comprise a foil or seal, to which the movable portion 268 may be attached. The movable portion 268 may be arranged to tear or break open the respective opening portion when it is pulled. The movable portion 268 may comprise an engaging element that at least partly protrudes from the exit opening portion 11, such as a string or cord that has a free end that can be engaged manually to pull the string or cord for opening the exit opening portion 11. In principle, the movable portion 268 may comprise any suitable protruding element that can be engaged manually with fingers. After opening the opening portion or opening portions, the capsule 2 may be placed in the apparatus 104 for dispensing the beverage.

In addition to above mentioned and other embodiments, entrance and/or exit filters may be provided next to and/or along the respective opening portions. For example, such filters are described here above with reference to FIG. 2. The exit filter and/or the entrance filter may be made from relatively strong and/or thick material so as to not be teared and/or pushed through together with the respective opening portion. For example, the exit filter and/or the entrance filter may comprise metal, and/or a strengthened paper, and/or plastic. The filter may for example be relatively thicker than the opening portion.

In above mentioned embodiments, the opening portion may be pierced. However, the skilled person may recognise that with the same or like movable portions, the respective opening portions may be teared loose from the inner wall of the capsule 2, or may be pushed out of its fitting.

In the foregoing, the extractable product 20 may comprise an extractable coffee or tea product, such as roasted and ground and/or cut coffee beans, dried and/or cut tea leaves. The extractable product 20 may also comprise chocolate extracts, milk powder, or any other suitable extractable or soluble product 20. The extractable product 20 could further comprise any mixture of the foregoing and/or any of the foregoing products put in layers on top of and/or between each other. Also chemical products for adding flavour to a fluid may be included in the extractable product 20. The extractable product 20 may be compressed to fit in the capsule 2. The fluid that is added to the extractable product 20 to obtain the beverage may for example comprise hot or cold water, or milk. The obtained beverage may comprise, amongst others, a coffee drink, tea drink, chocolate drink, or another beverage.

The fluid dispensing device of the system may be arranged for supplying the fluid to the exchangeable capsule under a pressure of approximately 4-20 bars, preferably 5-18 bars, more preferably 6-15 bars.

It shall be obvious that the invention is not limited in any way to the embodiments that are represented in the description and the drawings. Many variations and combinations are possible within the framework of the invention as outlined by the claims. Combinations of one or more aspects of the embodiments or combinations of different embodiments are possible within the framework of the invention. All comparable variations are understood to fall within the framework of the invention as outlined by the claims.

What is claimed is:

1. A system for preparing a predetermined quantity of beverage suitable for consumption using an extractable product, comprising:
    an exchangeable capsule,
    an apparatus comprising a fluid dispensing device for supplying an amount of fluid to the exchangeable capsule and having a bottom piercing means, a receptacle for holding the exchangeable capsule, and an outlet arrangement for supplying the beverage to a container, wherein:
        the capsule comprises a circumferential wall, a bottom comprising an entrance opening portion for letting fluid into the capsule, and a lid,
        the circumferential wall, the bottom and the lid enclose an inner space that comprises an extractable product,
        the system is arranged for bringing the fluid dispensing device in fluid connection with the entrance opening portion of the capsule for supplying the fluid to the extractable product for preparing the beverage,
        the system is further arranged so that, in use, the outlet arrangement is in fluid communication with an exit opening portion of the capsule for draining the prepared beverage from the capsule, wherein such capsule is sealed before use with the entrance opening portion being closed and the exit opening portion being closed and
        the capsule comprises at least one movable portion, wherein the bottom piercing means is arranged for pushing the at least one movable portion in the direction toward the exit opening portion without piercing the at least one movable portion, wherein the entrance opening portion is arranged so that a fluid passage opening is created by moving the at least one movable portion and is of approximately predetermined size and is provided at a predetermined location, in that the at least one movable portion forms at least a part of the bottom, wherein the capsule comprises cut outs for determining the size and location of the fluid passage opening and configured to enable movement of the at least one movable portion with respect to the circumferential wall and/or bottom and wherein the cut outs comprise a thinner section configured to break and form the fluid passage opening in the entrance opening portion.

2. The system according to claim 1, wherein movable portion support parts are between the cut outs.

3. The system according to claim 2, wherein the movable portion support parts comprise frangible bridges.

4. The system according to claim 2, wherein the movable portion support parts comprise relatively thin wall sections.

5. The system according to claim 1, wherein the exit opening portion is provided in the lid of the capsule.

6. The system according to claim 1, wherein the capsule comprises an entrance and/or the exit filter for letting fluid pass through while maintaining the extractable product inside the capsule.

7. The system according to claim 1, wherein the at least one movable portion comprises an internal movable portion that extends in the inner space of the capsule.

8. The system according to claim 1, wherein the bottom piercing means is arranged for piercing the bottom of an alternative capsule for providing an opening in the bottom of the alternative capsule for supplying the fluid to the extractable product for preparing the beverage.

9. The system according to claim 1, wherein the capsule comprises a relatively rigid rim that projects towards the outside of the capsule from the edge of the circumferential wall, and the circumferential wall is substantially rigid so that, in use, deformation of the circumferential wall with respect to the receptacle is prevented.

10. The system according to claim 1, wherein the receptacle comprises lid piercing means intended for piercing the exit opening portion of an alternative capsule when the exit opening portion is sufficiently pressed against the lid piercing means under the influence of pressure of the fluid and/or beverage in the alternative capsule for creating at least one exit opening through which the beverage drains from the alternative capsule, wherein the capsule comprises a second movable portion lined with the exit opening portion, the exit opening portion comprising exit openings that are sealed by the inner wall of the capsule, the lid piercing means being arranged for pushing the second movable portion into the capsule for creating a gap between the second movable portion and the lid or circumferential wall, so that the exit openings are released from the inner wall and fluid may flow through exit openings.

11. The system according to claim 1, wherein the exit opening portion is opened by at least partly deforming the lid so that a tension is created in the exit opening portion, which tension makes the exit opening portion break open.

12. The system according to claim 1, wherein the capsule is conceived to be opened by means of manually actuating the movable portion.

* * * * *